G. D. PARKER.
BOX MAKING MACHINE.
APPLICATION FILED JAN. 28, 1908.

993,545.

Patented May 30, 1911.
8 SHEETS—SHEET 8.

Witnesses
Edwin L. Bradford
R. Craig Greene

Inventor
George D. Parker
By Wallace Greene,
Attorney

UNITED STATES PATENT OFFICE.

GEORGE D. PARKER, OF RIVERSIDE, CALIFORNIA.

BOX-MAKING MACHINE.

993,545.　　　　Specification of Letters Patent.　　Patented May 30, 1911.

Application filed January 28, 1908. Serial No. 413,123.

*To all whom it may concern:*

Be it known that I, GEORGE D. PARKER, a citizen of the United States, residing at Riverside, in the county of Riverside and State of California, have invented certain new and useful Improvements in Box-Making Machines, of which the following is a specification, reference being had therein to the accompanying drawing.

My invention relates to improvements in automatic machines for making rectangular nailed boxes and involves devices for adjusting the machine for making boxes differing in size. The machine has distinct hoppers for each of the pieces used in a box, the sides are nailed simultaneously and then without moving the box, the bottom is nailed in place, thereby avoiding the turning of the partially made box.

In the accompanying drawings.

From four hoppers on the four sides of the machine, end and side pieces are fed into proper relative position, then raised above the plane of the hoppers, and then the side pieces are nailed to the ends. Immediately thereafter bottom pieces, resting in vertical hoppers therefor, are brought to position above the nailed parts and nailed in place, completing the box which is then released and ejected from the machine. The bottoms are ordinarily made from two pieces, usually of different widths, carried in hoppers on opposite sides of the machine and fed oppositely inward, at slightly different times. Each of the feeding mechanisms handles perfectly pieces varying to some extent in width.

In the various figures, A represents the base and B the vertical members of a rigid frame supporting the working devices, which include rocking nail hoppers C and nail chutes C', without novelty. From the central portion of the base rise parallel rigid standards D which serve as guides and supports for box forms and elevating devices.

Figure 6:
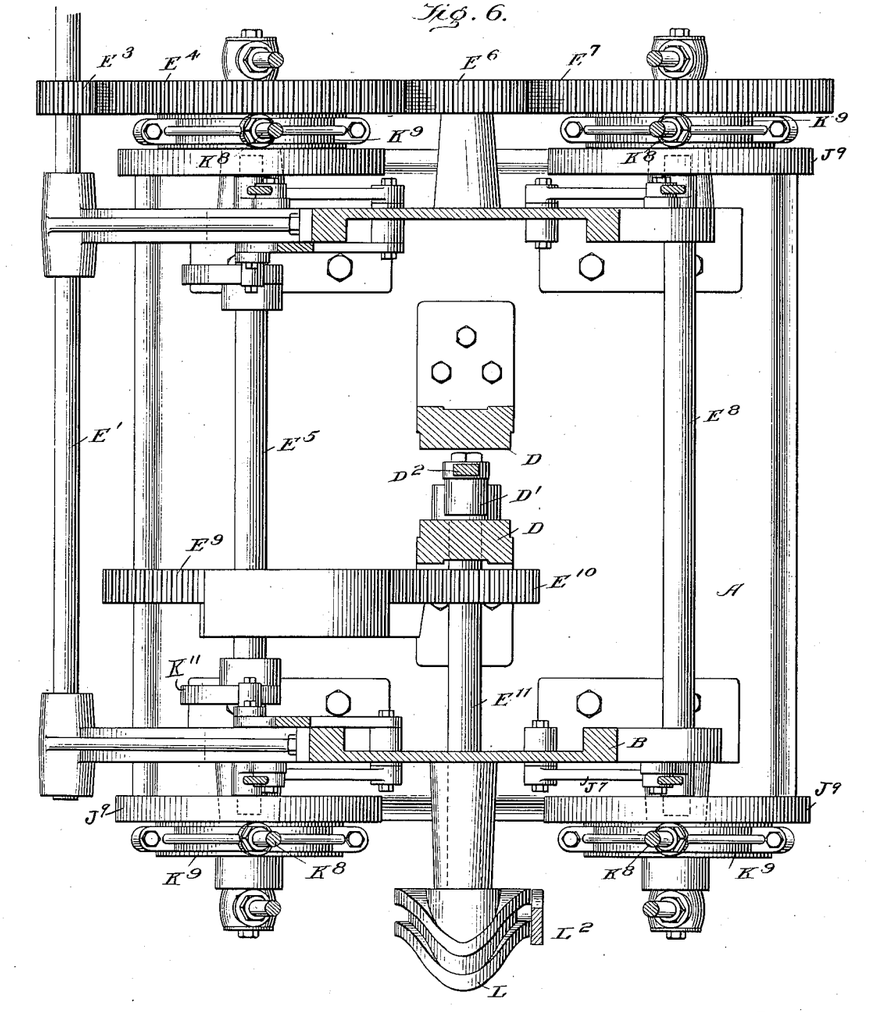
Fig. 6 is a plan view showing the main driving shafts and some connected devices.
Figure 7:
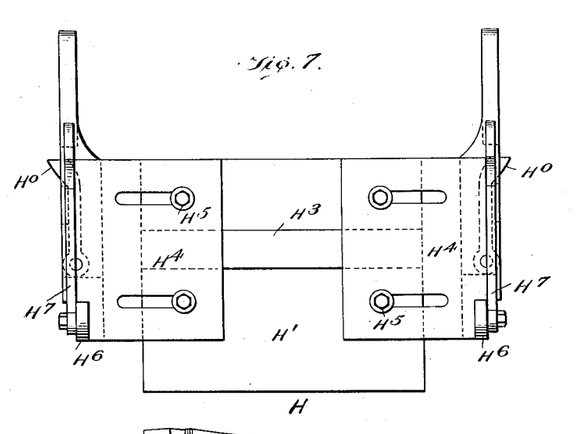
Fig. 7 is a side view of a certain elevator.

The machine is driven by a belt pulley E or the like clutched into engagement with a driving shaft E' by a hand lever $E^2$. The shaft E' by means of a pinion $E^3$ (Figs. 1, 2, 6) and gear $E^4$ drives a shaft $E^5$ and the latter gear through a pinion $E^6$ and gear $E^7$ drives a shaft $E^8$. The shaft $E^5$ by means of a multilated gear $E^9$, and gear $E^{10}$ drives a shaft $E^{11}$ for operating certain elevator mechanism.

Figure 1:
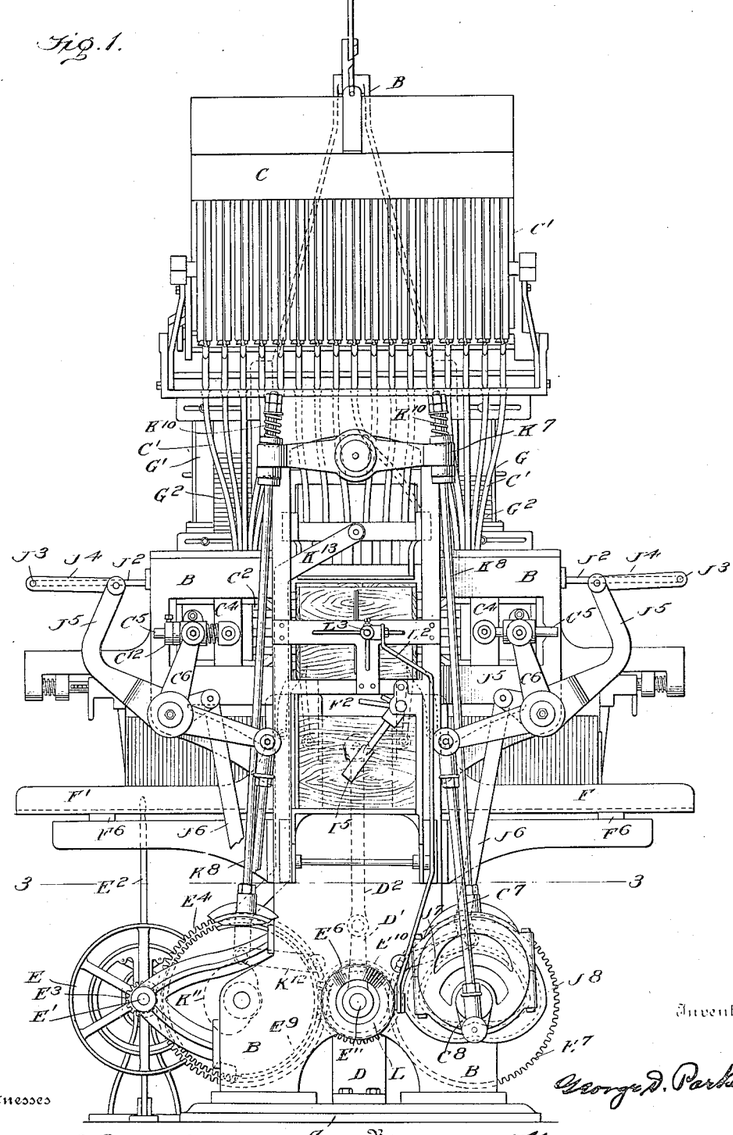
Figure 1 shows the machine in end elevation.
Figure 2:
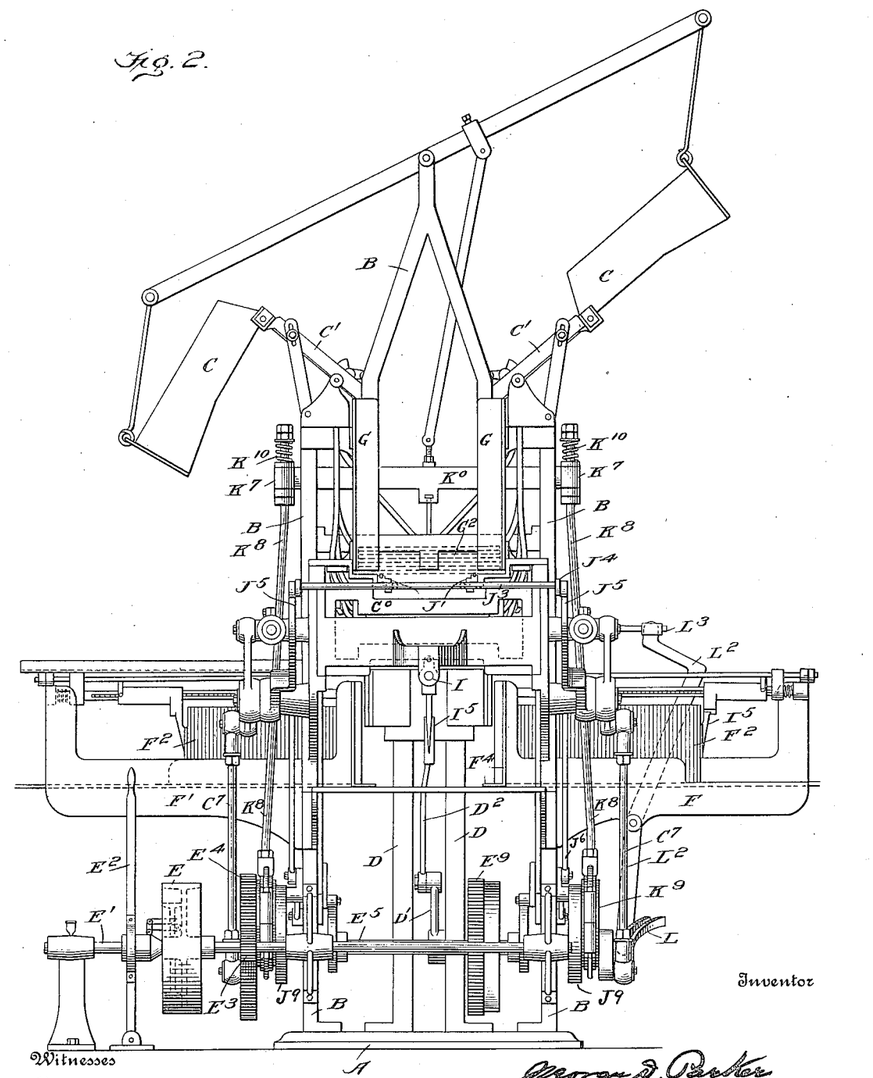
Fig. 2 is a side elevation looking from the right in Fig. 1.
Figure 3:
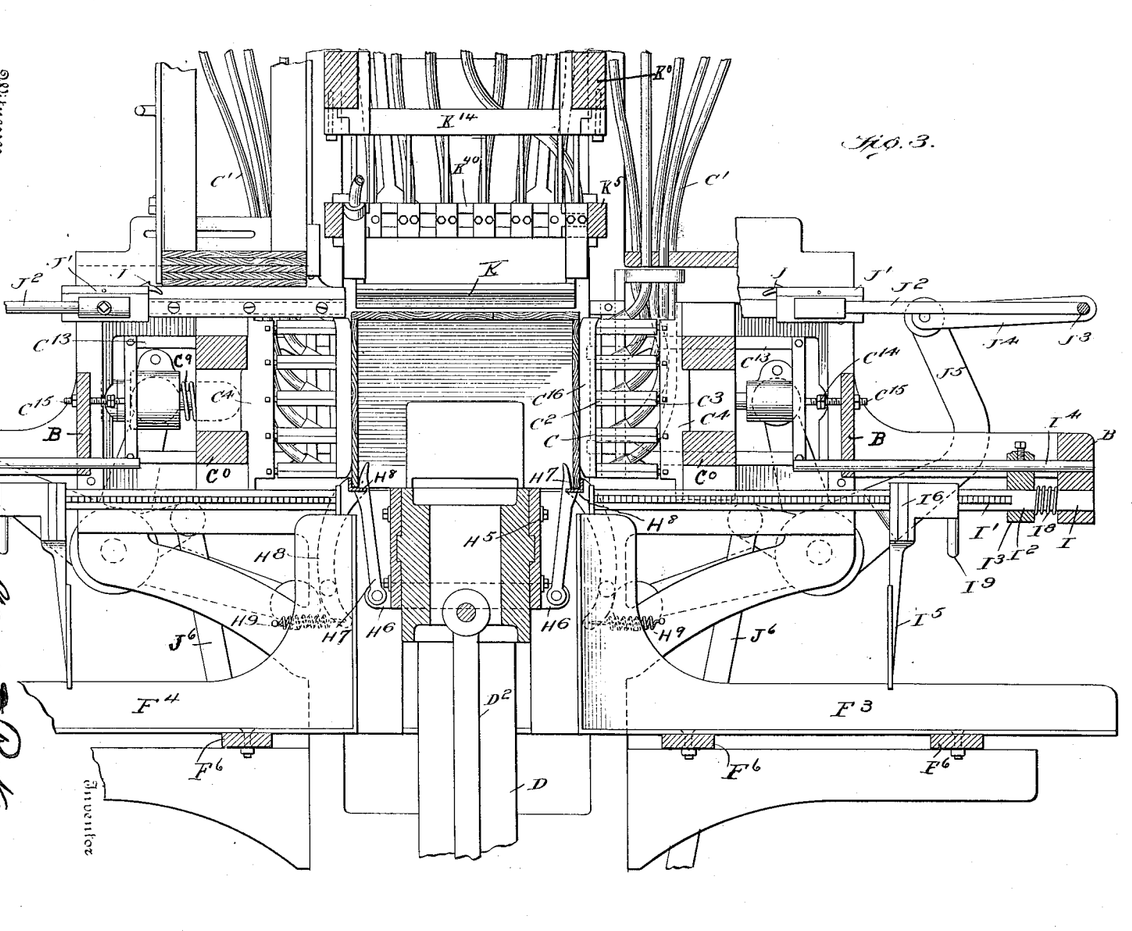
Fig. 3 is an elevation corresponding to the central part of Fig. 1, many parts being broken away.
Figure 4:
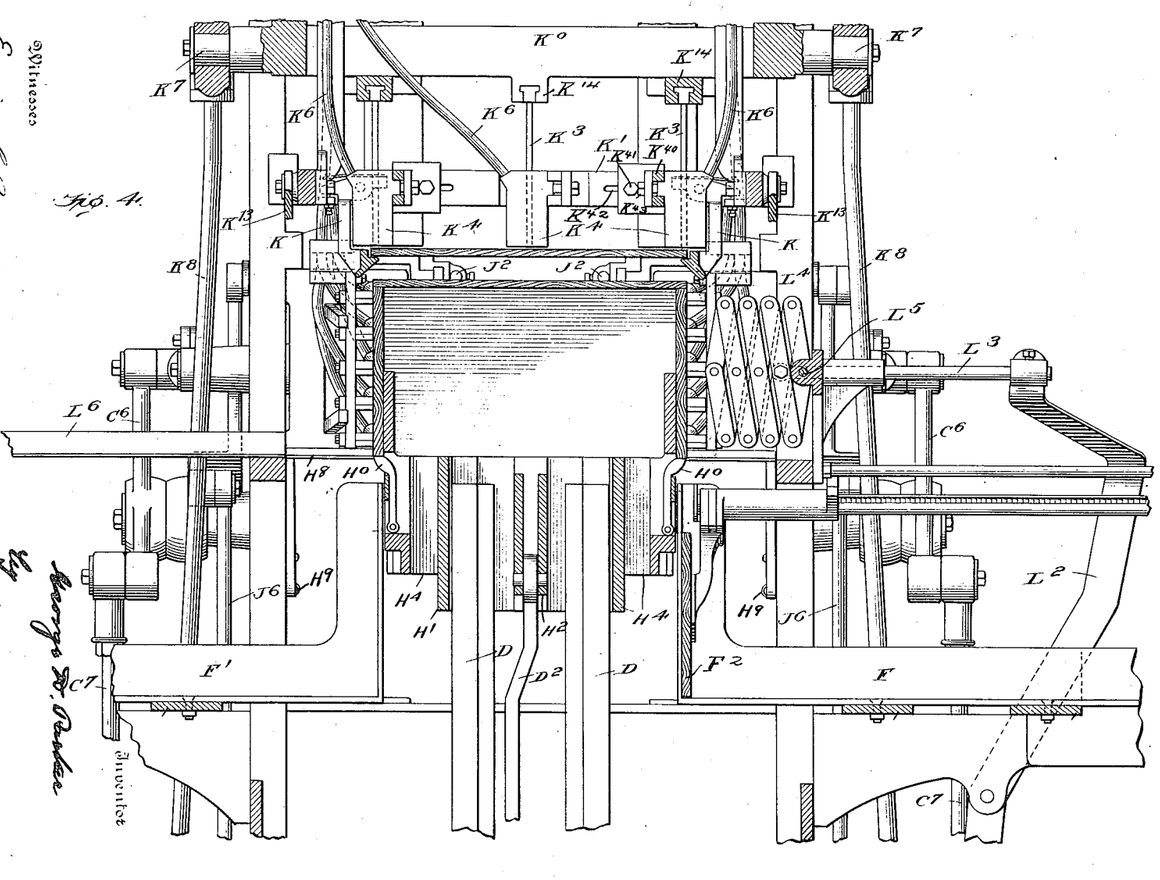
Fig. 4 is a similar view corresponding to Fig. 2.
Figure 5:
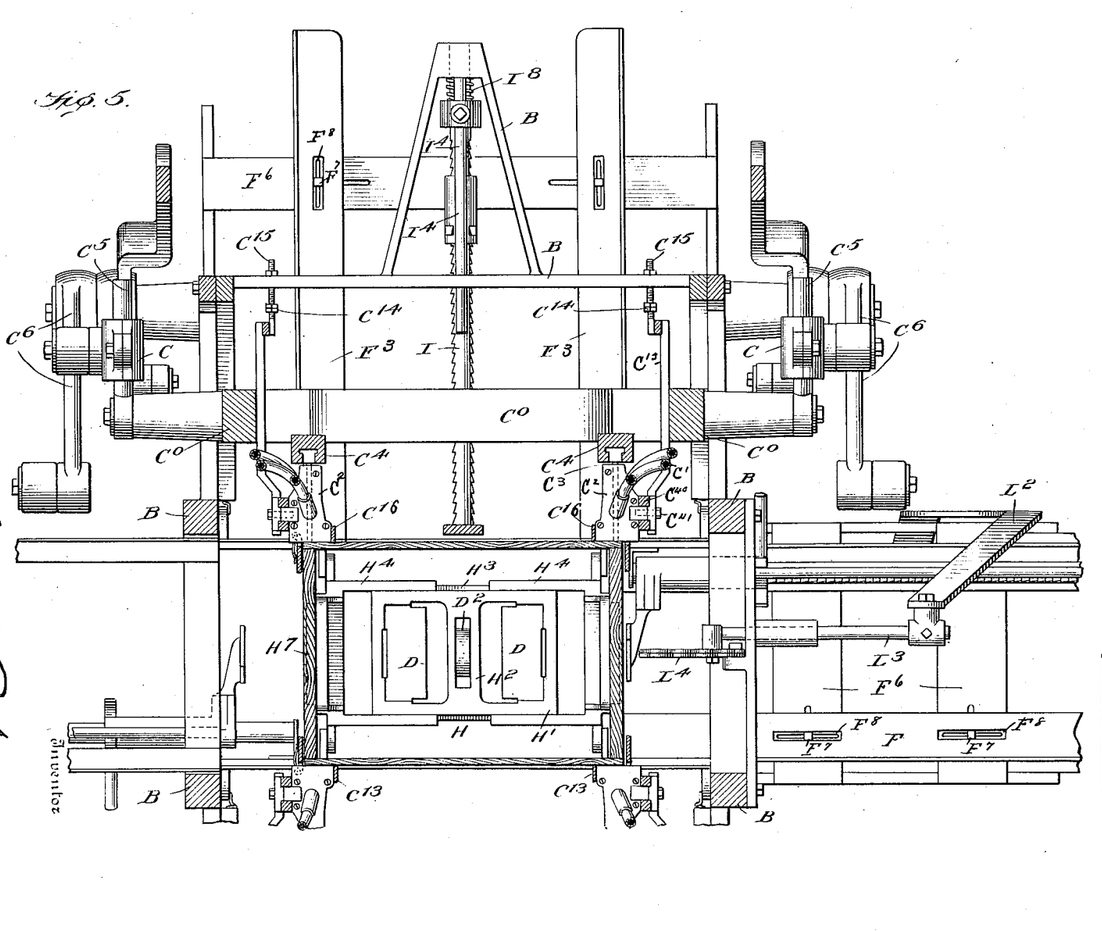
Fig. 5 is a partial plan view showing a certain elevator and mechanism for feeding stock thereto.
Figure 10:
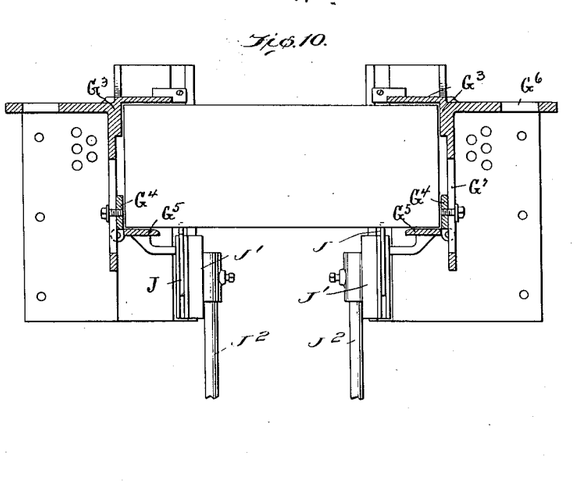
Fig. 10 is a section showing a bottom piece hopper, seen from above.

Upon two opposite sides of the frame are hoppers F, F', Figs. 2, 4, 5 for end pieces $F^2$, and upon the remaining sides of the frame are side piece hoppers $F^3$, $F^4$, Figs. 1, 3, 5, while above the plane of these hoppers, upon opposite sides of the frame, are hoppers G, G', Figs. 1, 2, 3, 4 for bottom pieces $G^2$, $G^2$. These vertical, bottom-hoppers, seen in sectional plan in Fig. 10, consist of vertical angle irons $G^3$, bars $G^4$ and bars $G^5$ hinged to $G^4$ to serve as doors operable for filling the hoppers. Slots $G^6$, $G^7$, for securing bolts, permit moving the angle irons and bars to adjust the length and width of these hoppers within certain limits. The side and end piece hoppers are merely pairs of spaced angle-iron members each adjustable along cross bars $F^6$ by any suitable construction, such as bolts $F^7$ working in slots $F^8$ in the angle irons and cross bars, respectively. The end and side pieces are pushed inward to an elevator H sliding vertically upon the standards D and actuated at proper times by the mutilated gear $E^9$, shaft $E^{11}$, a crank D', and pitman $D^2$, Figs. 1 and 3, and the boards are thus raised together, in proper relative position, above the plane of their hoppers and into the plane of side-nailing devices, a little below the plane of the bottom piece hoppers G, G'.

Figure 8:
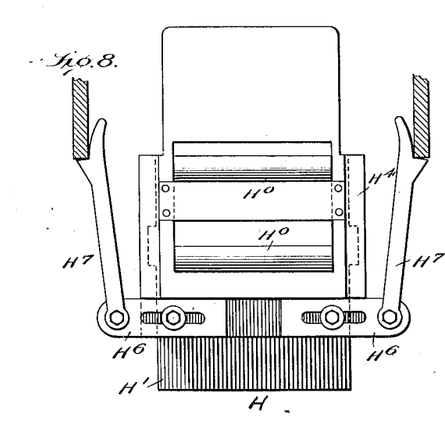
Fig. 8 is an end view of the same elevator.

The elevator body is a rectangular box-like frame H', smaller than the interior of the smallest box to be formed, closely fitting about the standards D and provided with a central cross-bar $H^2$ to receive the pitman $D^2$. To provide for boxes of various sizes, the body H' has upon its longer sides ribs $H^3$ upon which slide U-shaped members $H^4$ which are locked in desired position by bolts $H^5$, and thereby the length of the elevator may be varied at will, the parts $H^4$ in any such adjustment supporting the two end pieces. Upon the sides of each member $H^4$ are secured sliding members $H^6$, and to the outer end of each member $H^6$ is pivoted a dog or pawl $H^7$, these being adapted to engage the lower edges of the side pieces and raise them from their hoppers as the elevator rises. These pawls are bars pivoted at their lower ends, normally outwardly inclined, as seen in Fig. 8, and having upon their outer sides at some distance from their free upper ends side-piece engaging offsets above which the bars are curved inward. Usually the side-pieces of certain classes of boxes are very thin and often warped in various ways so that ordinary pawls fail to engage their edges. The construction set forth, however, insures such engagement since the pawls swing outward until the curved ends meet the box sides and, whether a side be inclined, inwardly convex or inwardly concave, its edge will be engaged by the offset. With boxes of the class mentioned, this feature makes rapid and certain operation possible, while with ordinary pivoted pawls the same machine has proved inoperative with warped stock. In recesses in the outer ends of the members $H^4$ above the members $H^6$ are pivoted other pawls $H^0$ to engage the end pieces in like manner but the form of pawl is not the same since the heavy end pieces are not subject to warping, practically. At the lowest position of the elevator, the piece engaging offsets lie slightly below the bottom of the four end and side piece hoppers.

Figure 11:
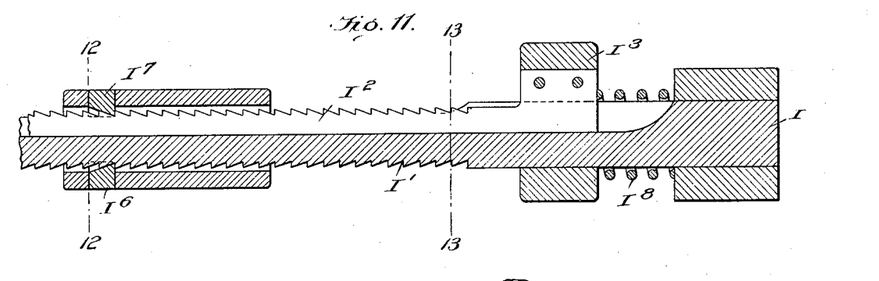
Fig. 11 is a longitudinal section of a ratchet feed for the side piece of the boxes.

The stock in each of the four hoppers is pressed inward against the inner ends of the hoppers, so that the foremost board is in position to be engaged by the elevator, by means to be described. Above each of these hoppers is a rigid horizontal guide rod I Figs. 3, 11, serrated on one side at I' and grooved upon its opposite side to receive a serrated sliding bar $I^2$ which is fixed to a collar $I^3$ sliding freely on the rod I but adjustably fixed to a parallel rod $I^4$ sliding on the frame and actuated at intervals by certain nailing devices. Upon the rod I slides a finger $I^5$ which normally rests against the outer side of the stock boards in the hopper. The sleeve of this finger contains a pawl $I^6$ which engages the teeth upon the rod I and resists outward movement of the finger, and also contains pawl $I^7$ engaging the teeth of the bar $I^2$. When the rod $I^4$ is pushed outward it carries with it the collar $I^3$ and compels the latter to compress a spring $I^8$ against the frame. When this collar thus moves, the bar $I^2$ moves with it, the teeth on the bar slipping past their pawl and the finger being held by the other pawl, and when the rod $I^4$ is released the spring urges the bar forward the other pawl slipping along its ratchet and the finger pushing the stock forward to compensate the removal of the front board by the rising elevator. The finger $I^5$ may be rotated on the rod by means of a handle $I^9$ throwing both pawls out of engagement and may then be moved freely back and forth on the rod.

Figure 9:
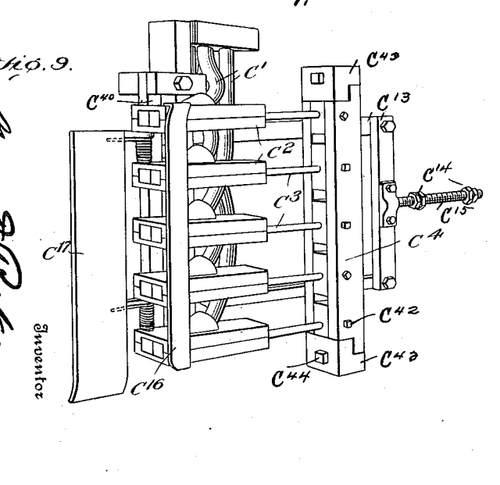
Fig. 9 is a detached view showing certain nailing devices in perspective.

The nailing of the side pieces to the end pieces after the set has been raised is done simultaneously by duplicate mechanisms on opposite sides of the machine. The nails are supplied in the usual way from the hoppers C by means of tubes C', which lead to horizontal chucks $C^2$ adjustably and detachably mounted in the frame and in which nailing rods or punches $C^3$ adjustably and detachably fixed in a head $C^4$ which is carried by a cross-bar $C^0$ which slides horizontally in ways in the frame, being carried by rods $C^5$, Fig. 1, bell cranks $C^6$, connecting rods $C^7$ and cranks $C^8$ upon the shaft $E^3$. Each set of chucks, Figs. 5, 9, is supported by a slotted or double bar $C^{40}$ of a frame $C^{13}$ which is freely movable in ways in the crosshead frame $C^0$ but has its movement limited by nuts $C^{14}$ on a rod $C^{15}$ projecting from the frame $C^{13}$ through a member of the main frame B. The chucks are locked to the slotted bar by bolts $C^{41}$, and by loosening these bolts they may be adjusted along the bar, while the bar itself may move toward or from the middle of the machine carrying with it the whole set of chucks which are secured thereto. The nail punches slide in dovetail grooves in the bars $C^4$ and are locked by bolts $C^{42}$. This bar itself is rigidly fixed to the head $C^0$ by clamp blocks $C^{43}$, Fig. 9, which overlap its end offsets and are secured to the head by bolts $C^{44}$. By loosening the bolts the bar is allowed to move bodily in a lateral direction. The force imparted by the bell-crank upon one side of the box is transmitted through a spring $C^9$ strong enough to resist flexure under ordinary nail-driving force but adapted to yield when a thick board opposes the completion of the stroke of the nailing mechanism, thereby avoiding breakage of any parts from this cause. In this instance the rod $C^5$ is provided with a shoulder $C^{10}$ Fig. 14, and with a sliding sleeve $C^{11}$ pivoted to the bell crank by means of a clamp $C^{50}$ and limited in its movement by by a collar $C^{12}$, the spring $C^9$ inclosing the rod between the shoulder and sleeve.

Figure 16:
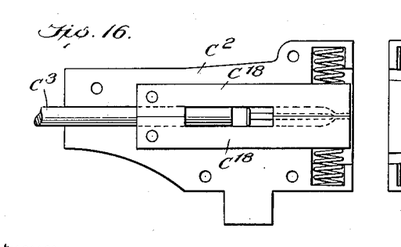
Fig. 16 shows half of a nailing chuck case with its spring jaws and driving rod.
Figure 17:
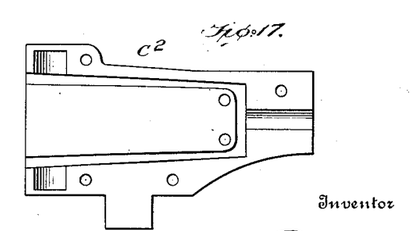
Fig. 17 shows the opposite half of the chuck case.

The chucks $C^2$ move slightly back and forth with the nailing punches $C^3$ so that as the latter advance the chucks approach the box closely and then move back slightly, away from the box, as the punches are retracted. Each set of chucks is shown as containing five, spaced one above the other in a vertical plane, and each set carries a vertical guard $C^{16}$ which projects a little in front of the chucks and is rounded at its lower end so that the rising boards are kept free from the ends of the chucks, and also carries a second vertical guard $C^{17}$ bent laterally at its lower end and connected to the chuck frame by spring hinges which cause it to yieldingly support the box end pieces. The chucks are provided with internal spring jaws $C^{18}$ (Fig. 16) between which the nails and the punch rods advance. The side nailing rods upon opposite sides of the box act oppositely in unison, and each resists the thrust of the other, but as the force required to drive the nails home is not always the same on the two sides the box may be very slightly displaced temporarily. For this reason, the bottom is not nailed in place until the side nailing is completed and the box re-assumes exact position. As the side nailing devices are retracted they strike the ends of the sliding rods $I^4$ already described and thus insure keeping the side piece feeding spring $I^8$ properly compressed.

For supporting the box after the descent of the form, I provide swinging runways $H^8$ pivoted to the side piece hoppers and urged to supporting position by springs $H^9$ which yield allowing the rising boards to pass and then throw the support beneath the lower edges of the latter.

Figures 12, 13, 14, 15:
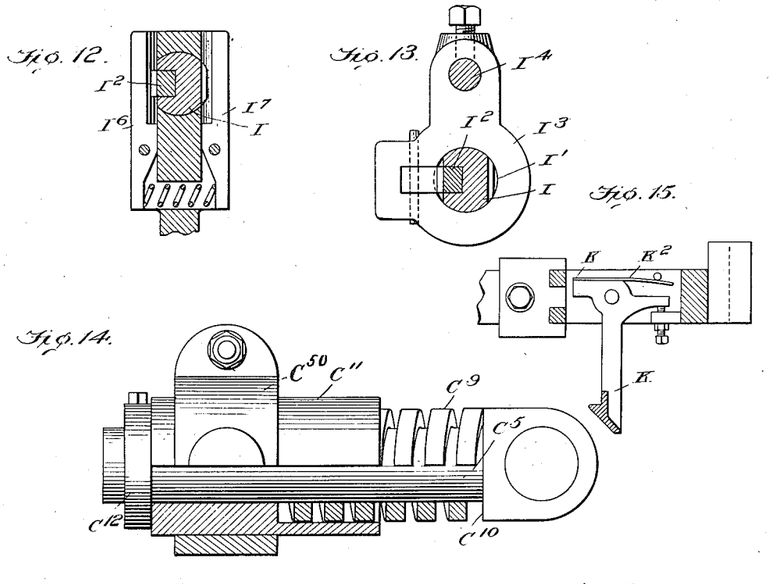
Fig. 12 is a section on the line 12—12, Fig. 11.
Fig. 13 is a section on the line 13—13, Fig. 11.
Fig. 14 is an enlarged detail view of a part of the side nailing mechanism, seen also in the general views.
Fig. 15 is an enlarged detail view showing certain bottom supporting hooks.

The bottom of the box is supposed in this instance to be made of two boards of unequal width, those of each width being piled or placed in a distinct hopper G or G', and the two hoppers being at the same level on opposite sides of the machine with the lower board in each case slightly above the plane of the upper edges of the incomplete box. The boards are taken from the bottom of each downwardly open hopper by means of pawls J, Figs. 1, 2, 10 (analogous to those for raising the side pieces) carried by members J' sliding back and forth in ways just below the hopper. Each of these slides J' is connected by a rod $J^2$ to a transverse bar $J^3$ the ends of which are connected by links $J^4$ to the upper ends of bell-cranks $J^5$, those on the right hand in Fig. 1, oscillated by links $J^6$ connected to link $J^7$, Figs. 1, 2, 6 pivoted to the frame at one end and lying in a circumferential groove in a cam $J^9$ upon the shaft $E^8$, and those upon the left being oscillated by equivalent mechanism from a cam upon the shaft $E^5$. The two actuating cams operate one slightly in advance of the other so that should either bottom piece be slightly too wide, the first board being already released may be pushed back by the second, as the latter comes to place, thereby avoiding special yielding devices otherwise required to eliminate danger of breakage by wide boards. The bottom boards thus carried inward to position are left free upon swinging hooks K depending from chuck bars K'. These hooks K, Figs. 4, 15, are shown as pivoted bell-cranks having outwardly beveled lower ends and having springs $K^2$ arranged to hold the hooks in board-supporting position. The driver heads $K^0$ carry a series of nail punches $K^3$ which work in nail chucks $K^4$ mounted in the chuck frames or bars $K^5$ and, like the side nail chucks, receiving nails through tubes $K^6$ from hoppers above. The punches are adjusted in bars $K^{14}$ analogous to the bars $C^4$ of the side nailing devices and secured to the driving head by like means. The chuck frame K' has double or slotted cross bars $K^{40}$ the ends of which are locked to the bars by bolts $K^{41}$ working in slots $K^{42}$, whereby the bars may be adjusted bodily in lateral directions. The chucks $K^4$ engage in the slots in the bars $K^{40}$, slide along the bars and are locked by bolts $K^{43}$. The middle bar, like the middle bar $K^{14}$, needs no adjustment. The driving head $K^0$ is a heavy bar or frame extending across the machine and provided at each end with rigid projections $K^7$ the ends of which receive connecting rods $K^8$ from eccentrics $K^9$ upon the shafts $E^5$, $E^8$, respectively, the member $K^0$ being thus reciprocated by four co-acting similar eccentrics. The projections $K^7$ normally rest upon fixed collars upon the several connecting rods and are held down by springs $K^{10}$ stiff enough to resist without yielding ordinary driving pressure, but adapted to yield when unusual resistance might otherwise endanger the machine. The chuck frame $K^5$ is caused to reciprocate toward and away from the box by cams $K^{11}$ acting on links $K^{12}$ pivoted at one end to the frame and at the other end pivoted to bent connecting rods $K^{13}$ which carry the chuck frame. As the chuck frame descends it lowers the boards upon the nailed sides and ends, the beveled ends of the hooks striking the edges of the box and swinging outward, and the next instant the nails are driven home by the nailing punches, completing the box. The completed box is automatically pushed out of the machine by a peripherally grooved cam L upon the shaft $E^{11}$, this cam acting through a pivoted lever $L^2$ having at its lower end a roller running in the cam groove and being pivotally connected at its upper end with a horizontally sliding rod $L^3$ having its inner end attached to one member of a multiple lazy-tongs device $L^4$ which has its terminal member pivoted to the frame at $L^5$ in the medial plane of the box. When the rod $L^3$ is pushed inward, the lazy-tongs device is shot inward pushing the box along the swinging ways $H^8$ and the fixed ways $L^6$, upon the opposite side, out of the machine.

What I claim is:

1. In apparatus of the class described, the combination with means for feeding sides and ends to box forming mechanism, of a non-rotary device in position to receive and hold said sides and ends, means for transferring said device with its sides and ends out of the paths of the feeding devices, means for then nailing sides and ends together, means independent of the said device for supporting the nailed sides and ends, means for restoring said device to initial position, means for feeding bottom pieces to position while the sides and ends are thus supported, and means for nailing the bottoms in place.

2. In apparatus of the class described, the combination with the body of a box form, of end holding members mounted upon said body, at two opposite sides thereof, to be adjusted toward and from the same, and side holding devices mounted upon said members to be adjusted toward and from the sides of the body, substantially as set forth.

3. In apparatus of the class described, the combination with means for supporting the connected sides and ends of a box, of means for feeding a bottom board from one side to nailing position, and means for feeding another bottom board from the opposite side against the first mentioned board, the second feeding means being timed to complete the feeding after the release of the first board.

4. The combination with hoppers adapted to hold box side pieces in vertical position upon opposite sides of a central space, of a box form arranged to reciprocate in said space and provided upon the sides next said hoppers with normally inclined pawl bars pivoted at their lower ends and having upon their outer sides near their free ends shoulders to engage the foremost box sides in said hoppers, respectively, substantially as set forth.

5. The combination with a box form arranged to rise and fall in a vertical path, of sets of pawl bars pivoted at their lower ends to opposite sides of the form and having their upper ends normally slightly inclined outward and provided upon their outer sides with side piece engaging shoulders, and hoppers upon opposite sides of the upper part of said path and each adapted to hold a series of side pieces in approximately vertical position with the foremost one in the upward path of said shoulders of the corresponding pawl bars, substantially as set forth.

6. In apparatus of the class described, the combination with means for holding the sides and ends of a box in vertical planes about a central space, of a box form reciprocating vertically in said space, means whereby in rising the form carries the sides and ends of a box above their original horizontal plane, means for nailing the sides and ends together while so raised, means for feeding bottoms to position over the nailed sides and ends while the sides and ends remain unmoved in such raised position and means for then nailing the bottoms in place without moving the box.

7. In apparatus of the class described, the combination with a box form, of means for supplying box sides and ends for said form, means for raising the form and its side and end pieces, and laterally movable members arranged to swing beneath both sides and ends, as the latter reach their highest point, to support the box after the form again descends.

8. The combination with box piece feeding devices in the same horizontal plane upon the four sides of an intermediate space, of two nailing devices upon opposite sides of said space in a second parallel higher plane, a box form arranged to reciprocate in said space, bottom piece feeding devices in a third still higher parallel plane, bottom nailing devices directly above said space, a box discharging way in the second plane upon one of the sides free from nailing devices, a box ejecting device opposite said way, and means for operating the said devices in proper succession.

9. In apparatus of the class described, the combination with hoppers for box pieces, of a box form primarily below the plane of said hoppers, means whereby the form is raised at intervals above said plane, means whereby the form in rising engages and carries with it the first board in each hopper, spring-pressed devices arranged to correspondingly advance the stock in each hopper, and automatic means for restoring the initial tension of the springs.

10. The combination with a hopper for box pieces, of a member arranged in the rear of the stock in the hopper, a spring urging said member forward, means for restoring initial tension to said spring after each advance of stock, and means for at will releasing said member and allowing it to move freely to the outer end of the hopper.

11. The combination with means for assembling the end and side pieces in proper relative position for nailing, means for raising the assembled pieces into another plane, of laterally movable nailing devices arranged alongside the side pieces, and a spring-actuated member attached to the nailing devices in position to extend over the rising end pieces and hold them against outward movement.

12. The combination with means for assembling sides and end pieces, of means for raising the assembled pieces above the plane of the assembling means, nailing devices adjustable longitudinally with respect to the side pieces and in position to nail the raised sides to the ends, spring actuated swinging members projecting from the nailing devices alongside the paths of the end pieces, respectively, to guide them in rising and hold each against swinging outward beyond the end of the side pieces.

13. In apparatus of the class described, the combination with a box form, of means for adjusting the size of the form, automatic means for assembling box boards about said form, means for raising the form and boards, automatic means for securing the assembled boards together, automatic means for then withdrawing the form, automatic means for supporting the box after such withdrawal and automatic means for ejecting the formed box horizontally along said supporting means.

In testimony whereof I affix my signature in presence of two witnesses.

GEORGE D. PARKER.

Witnesses:
C. S. BERGESS,
ERNEST CARLSON.